(12) United States Patent
Martin et al.

(10) Patent No.: US 6,510,401 B2
(45) Date of Patent: Jan. 21, 2003

(54) METHOD OF AUTHENTICATING BEACON

(75) Inventors: Kenneth I. Martin, Columbia, MD (US); Kenneth E. Summers, Pasadena, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 117 days.

(21) Appl. No.: 09/854,194

(22) Filed: May 11, 2001

(65) Prior Publication Data
US 2002/0173937 A1 Nov. 21, 2002

(51) Int. Cl.[7] .............................................. H04B 10/00
(52) U.S. Cl. ...................... 702/150; 359/154; 356/614; 342/417
(58) Field of Search ............................ 702/193, 94, 95, 702/150, 151, 152; 359/2, 159, 172; 342/37, 417–449; 380/258; 356/71, 614, 615, 622

(56) References Cited

U.S. PATENT DOCUMENTS

| | | | |
|---|---|---|---|
| 4,385,301 A | * 5/1983 | Tricoles et al. | ............ 342/445 |
| 4,401,886 A | 8/1983 | Pond et al. | |
| 4,834,531 A | 5/1989 | Ward | |
| 4,867,560 A | 9/1989 | Kunitsugu | |
| 5,062,150 A | 10/1991 | Swanson et al. | |
| 5,119,225 A | 6/1992 | Grant et al. | |
| 5,142,400 A | 8/1992 | Solinsky | |
| 5,390,040 A | 2/1995 | Mayeux | |
| 5,465,170 A | 11/1995 | Arimoto | |
| 5,475,520 A | 12/1995 | Wissinger | |
| 5,592,320 A | 1/1997 | Wissinger | |
| 5,594,580 A | 1/1997 | Sakanaka et al. | |
| 5,610,750 A | 3/1997 | Popescu et al. | |
| 5,621,325 A | * 4/1997 | Draper et al. | ............... 324/326 |
| 5,684,614 A | 11/1997 | Degura | |
| 5,710,652 A | 1/1998 | Bloom et al. | |
| 5,799,082 A | * 8/1998 | Murphy et al. | ............. 713/179 |
| 5,867,294 A | 2/1999 | Sakai | |
| 5,923,452 A | 7/1999 | Carlson | |
| 5,953,146 A | 9/1999 | Shelby | |
| 5,973,310 A | 10/1999 | Lunscher | |
| 5,991,062 A | 11/1999 | Fischer et al. | |
| 6,137,566 A | * 10/2000 | Leonard et al. | .......... 356/141.1 |

* cited by examiner

*Primary Examiner*—Marc S. Hoff
*Assistant Examiner*—Jeffrey R West
(74) *Attorney, Agent, or Firm*—Robert D. Morelli

(57) ABSTRACT

A beacon modulated by a pattern is authenticated by recording an array of light intensities for each point in a field of view; digitizing the array of light intensities; modifying a first array according to the digitized light-intensities and the modulation pattern; repeating these steps for additional frames at the current viewpoint; if the beacon is found then repeating these steps for additional frames; if the beacon is found and additional frames were processed then authenticating the beacon at the point in the current viewpoint corresponding to the value in the first array that exceeds a first threshold by the widest margin; if the beacon was not found, moving to a new point in the field of view and repeating the steps above; if the beacon is again not found, adjusting the modulation bit pattern x bits, and reprocessing the viewpoints in the field of view using the steps above.

12 Claims, 1 Drawing Sheet

METHOD OF AUTHENTICATING BEACON

FIELD OF THE INVENTION

The present invention relates, in general, to optics systems (including communication) and elements and, in particular, to optical transceiver with alignment between transmitter and receiver.

BACKGROUND OF THE INVENTION

Technological advances in semiconductor lasers, photo detectors, and semiconductor sensor arrays have led to laser communication systems being a viable alternative to conventional radio frequency (RF) systems. Free-space laser communication systems are expected to be a significant component of future communications, including terrestrial, airborne, and especially satellite applications.

The short wavelengths of the optical/infrared spectrum allow a transmission to be focused into a narrow beam. A narrow beam allows a great transmission distance. However, accurate pointing of a laser beam between communication terminals requires a spatial acquisition and tracking system. With the present usage of laser communication systems being low as compared to other types of communication systems, the present procedure of assuming that any laser beam received is the intended laser beam is reasonable. Therefore, present manufacturers of laser communication equipment have not seen a need to make any further improvements. Future laser communication usage is expected to be much greater than present usage, and applications may necessitate multiple co-located terminals. As a result, the present procedure could be unreliable and potentially disastrous.

Prior art methods of acquiring a laser beam include fixed mechanical pointing, transmit beam search, retro-reflector search, and use of a dedicated continuous beacon. Each prior art method fails to authenticate the received laser beam or beacon before applying pointing adjustments.

In the fixed pointing method, laser transmitters and receivers are rigidly mounted and manually aimed. Loss of communication in the fixed-pointing method often requires manually adjusting the spatial orientation of the transmitter and/or the receiver.

In the transmit beam search method, automated search and alignment methods are employed to acquire the communication laser beam over an angular search area and a tradeoff exists between search area and search time. The search process is more complex and lengthy when complementary receivers are searching simultaneously for non-stationary beams. Pointing of laser beams at incorrect (unauthenticated) targets will delay or prevent proper alignment.

In the retro-reflector search method, a passive reflector is used to reflect the transmitted laser beam that scans the search area until the reflection is detected. Reflected laser beams from multiple simple reflectors are indistinguishable and proper pointing is again delayed or prevented.

In the dedicated beacon method, a laser beacon is dedicated to the problem of aligning the transmitter and receiver. A laser beacon normally has a larger beam width than a communication laser beam and, therefore, requires fewer search steps, and less time, to align the receiver to the transmitter. Prior art methods employ continuous (unmodulated) beacons. Pointing of laser beams at incorrect (unauthenticated) targets will again delay or prevent proper alignment.

Several pointing alignment methods have been proposed. U.S. Pat. No. 4,401,886, entitled "ELECTROMAGNETIC BEAM ACQUISITION AND TRACKING SYSTEM," discloses a device for scanning a laser beam over a field of view and use of a retro-reflector to return the beam to the transmitter that employs a photo multiplier detector. Dithering the beam around a central axis generates the pointing error employed in the steering process. The retro-reflector approach provides a useful beacon for short communication distances. However, reliable pointing demands that only the intended retro-reflector be in the field of view. Any source of reflection other than the reflector would interfere with operation. However, U.S. Pat. No. 4,401,886 does not disclose the present invention. U.S. Pat. No. 4,401,886 is hereby incorporated by reference into the specification of the present invention.

U.S. Pat. No. 4,834,531, entitled "DEAD RECKONING OPTOELECTRONIC INTELLIGENT DOCKING SYSTEM," discloses a device that uses independently triggered laser sources for illuminating and isolating a target. U. S. Pat. No. 4,834,531 does not disclose the present invention. U.S. Pat. No. 4,834,531 is hereby incorporated by reference into the specification of the present invention.

U.S. Pat. No. 4,867,560, entitled "OPTICAL ALIGNMENT SYSTEM," discloses a device for aligning two transceivers using two beams, where adjustments in alignment are made based on the difference in magnitude between respective quarters of the two beams from a reference value. However, U.S. Pat. No. 4,867,560 does not disclose the present invention. U.S. Pat. No. 4,867,560 is hereby incorporated by reference into the specification of the present invention.

U.S. Pat. No. 5,062,150, entitled "FIBER-BASED FREE-SPACE OPTICAL SYSTEM," discloses a device for coupling received and transmitted light over a physically nutating optical fiber. Modulation of the received signal caused by the nutation is used to make pointing adjustments of a steering mirror to align the transmit/receive beam. However, U.S. Pat. No. 5,062,150 does not disclose the present invention. U.S. Pat. No. 5,062,150 is hereby incorporated by reference into the specification of the present invention.

U.S. Pat. No. 5,119,225, entitled "MULTIPLE ACCESS COMMUNICATION SYSTEM," discloses a device for and a method of locating multiple terminals using a single narrow scanning beacon. However, U.S. Pat. No. 5,119,225 does not disclose the present invention. U.S. Pat. No. 5,119,225 is hereby incorporated by reference into the specification of the present invention.

U.S. Pat. No. 5,142,400, entitled "METHOD AND APPARATUS FOR AUTOMATIC ACQUISITION AND ALIGNMENT OF AN OPTICAL BEAM COMMUNICATION LINK," discloses a device for and method of establishing a communication link using a search mode, a stare mode, and retro-reflectors. However, U.S. Pat. No. 5,142,400 does not disclose the present invention. U.S. Pat. No. 5,142,400 is hereby incorporated by reference into the specification of the present invention.

U.S. Pat. No. 5,390,040, entitled "OPTICAL TRANSCEIVER FOR FREE-SPACE COMMUNICATION LINKS," discloses a device for acquiring a communication signal using the step-stare approach. However, U.S. Pat. No. 5,390,040 does not disclose the present invention. U.S. Pat. No. 5,390,040 is hereby incorporated by reference into the specification of the present invention.

U.S. Pat. No. 5,465,170, entitled "ALIGNMENT ADJUSTING SYSTEM FOR USE IN OPTICAL SYSTEM OF OPTICAL TRANSCEIVER," discloses a device for and method of for overcoming misalignment of optical systems due to thermal expansion. However, U.S. Pat. No. 5,465,170 does not disclose the present invention. U.S. Pat. No. 5,465,170 is hereby incorporated by reference into the specification of the present invention.

U.S. Pat. No. 5,475,520 entitled "SATELLITE COMMUNICATIONS SYSTEM" discloses a device for communicating via an optical beam by a first transceiver transmitting a number of signals, each uniquely modulated, a second transceiver returning the signals it receives, and adjusting the transmission area to insure reception by the second transceiver of all the signals transmitted by the first transceiver. However, U.S. Pat. No. 5,475,520 does not disclose the present invention. U.S. Pat. No. 5,475,520 is hereby incorporated by reference into the specification of the present invention.

U.S. Pat. No. 5,592,320, entitled "SATELLITE COMMUNICATIONS SYSTEM" discloses a device for communicating via an optical beam by a first transceiver scanning a first beam, a second transceiver scanning a second beam modulated by the time that the first beam was received, the first transceiver scanning modulating the first beam by the time that the second beam was received, and adjusting the scans of both transceivers to be in alignment. However, U.S. Pat. No. 5,592,320 does not disclose the method of the present invention. U.S. Pat. No. 5,592,320 is hereby incorporated by reference into the specification of the present invention.

U.S. Pat. No. 5,594,580, entitled "OPTICAL SPACE COMMUNICATION APPARATUS," discloses a device for and method of propagating a beam of light through free space to effect communication. However, U.S. Pat. No. 5,594,580 does not disclose the method of the present invention. U.S. Pat. No. 5,594,580 is hereby incorporated by reference into the specification of the present invention.

U.S. Pat. No. 5,610,750, entitled "OPTICAL COMMUNICATIONS TERMINAL," discloses a device for inter-satellite communication that includes several telescope modules where each module is operated by a laser, where each beam from the laser may have a data signal modulated thereon, and where one of the modules is used for acquisition and tracking. However, U.S. Pat. No. 5,610,750 does not disclose the method of the present invention. U.S. Pat. No. 5,610,750 is hereby incorporated by reference into the specification of the present invention.

U.S. Pat. No. 5,684,614, entitled "OPTICAL SPACE COMMUNICATION APPARATUS," discloses a device for and method of correcting the angle of light transmitted or received by multiplexing a pilot signal, a transmission signal, filtering the same at the receiver to determine the presence of the pilot beam, and correcting the angle of light transmitted or received. However, U.S. Pat. No. 5,684,614 does not disclose the present invention and is hereby incorporated by reference into the specification of the present invention.

U.S. Pat. No. 5,710,652, entitled "LASER COMMUNICATION TRANSCEIVER AND SYSTEM" discloses a device for communicating via a laser where a beacon beam is recognized and accepted if the frequency of the beacon beam is as expected. However, U.S. Pat. No. 5,710,652 does not disclose the method of the present invention. U.S. Pat. No. 5,710,652 is hereby incorporated by reference into the specification of the present invention.

U.S. Pat. No. 5,867,294, entitled "OPTICAL SPACE COMMUNICATION APPARATUS," discloses a device for performing optical space communication while correcting alignment of an optical axis using an optical element rockable about at least two axes and voice coil motors. However, U.S. Pat. No. 5,867,294 does not disclose the method of the present invention. U.S. Pat. No. 5,867,294 is hereby incorporated by reference into the specification of the present invention.

U.S. Pat. No. 5,923,452, entitled "LASER SATELLITE COMMUNICATION SYSTEM" discloses a device for communicating via a laser and employs separate beacons for acquisition and pointing. However, U.S. Pat. No. 5,923,452 does not disclose the method of the present invention. U.S. Pat. No. 5,923,452 is hereby incorporated by reference into the specification of the present invention.

U.S. Pat. No. 5,953,146, entitled "METHOD AND APPARATUS FOR TRACKING ALIGNMENT IN WIRELESS OPTICAL COMMUNICATIONS," discloses a device for and method of optical communication using an array sensor to recover data that is then evaluated using the principles of geometric invariance to determine the accuracy of alignment. However, U.S. Pat. No. 5,953,146 does not disclose the method of the present invention. U.S. Pat. No. 5,953,146 is hereby incorporated by reference into the specification of the present invention.

U.S. Pat. No. 5,973,310, entitled "OPTICAL ACQUISITION AND TRACKING SYSTEM" discloses a method of continuously monitoring the presence and location of an optical signal. However, U.S. Pat. No. 5,973,310 does not disclose the method of the present invention. U.S. Pat. No. 5,973,310 is hereby incorporated by reference into the specification of the present invention.

U.S. Pat. No. 5,991,062, entitled "METHOD AND DEVICE FOR OBTAINING ERROR SIGNALS FOR SPATIAL BEAM REGULATION OF AN OPTICAL COHERENT RECEIVER" discloses a device for and method of aligning two light waves in order to superimpose one on the other. However, U.S. Pat. No. 5,991,062 does not disclose the method of the present invention. U.S. Pat. No. 5,991,062 is hereby incorporated by reference into the specification of the present invention.

SUMMARY OF THE INVENTION

It is an object of the present invention to identify (i.e., authenticate) a particular beacon within an angular search area by detecting a beacon intensity-modulated by a specific user-definable bit pattern. The identity of a particular beacon, after being located, can be continuously reconfirmed for tracking purposes.

The present invention is a method of authenticating a beacon.

The first step of the method is establishing a first threshold and a second threshold.

The second step of the method is identifying a current field of view in which a search for a beacon will be conducted, where the current field of view includes a user-definable number of elements.

The third step of the method is initializing each entry in a first array.

The fourth step of the method is recording a frame of signal intensity value for the elements of the current field of view and storing the same in corresponding entries in a second array.

The fifth step of the method is digitizing the signal intensity values recorded in the fourth step using the second threshold.

The sixth step of the method is modifying the values in the first array according to the digitized signal intensity values of the fifth step and a user-definable modulation bit pattern.

If the desired number of frames has not been processed at the current field of view then the seventh step is returning to the fourth step to acquire another frame and continue from the fourth step to process the new frame. However, if the desired number of frames has been acquired and processed then proceed to the next conditional step where the condition is satisfied.

If the first array contains a value that exceeds the first threshold and additional processing is desired then the eighth step is returning to the fourth step to acquire another frame at the current viewpoint and continuing from there to process the new frame.

If the first array contains a value that exceeds the first threshold and the desired number of frames have been acquired and processed, then the ninth step of the method is declaring the beacon at the element in the current field of view that corresponds to the highest value in the first array to be authenticated and stopping.

If none of the values in the first array exceeds the first threshold then the tenth step of the method is setting the current viewpoint to another area in the search area that has not been processed and returning to the third step for additional processing.

If each field of view in a search area is processed and no beacon is found and further processing is desired then the eleventh, and last, step of the method is adjusting (e.g., advancing or delaying) the user-definable bit pattern x bits and using the adjusted pattern as the user-definable bit pattern for processing purposes, ignoring the results of previous steps, and returning to the first step for further processing.

DETAILED DESCRIPTION

Figure 1:
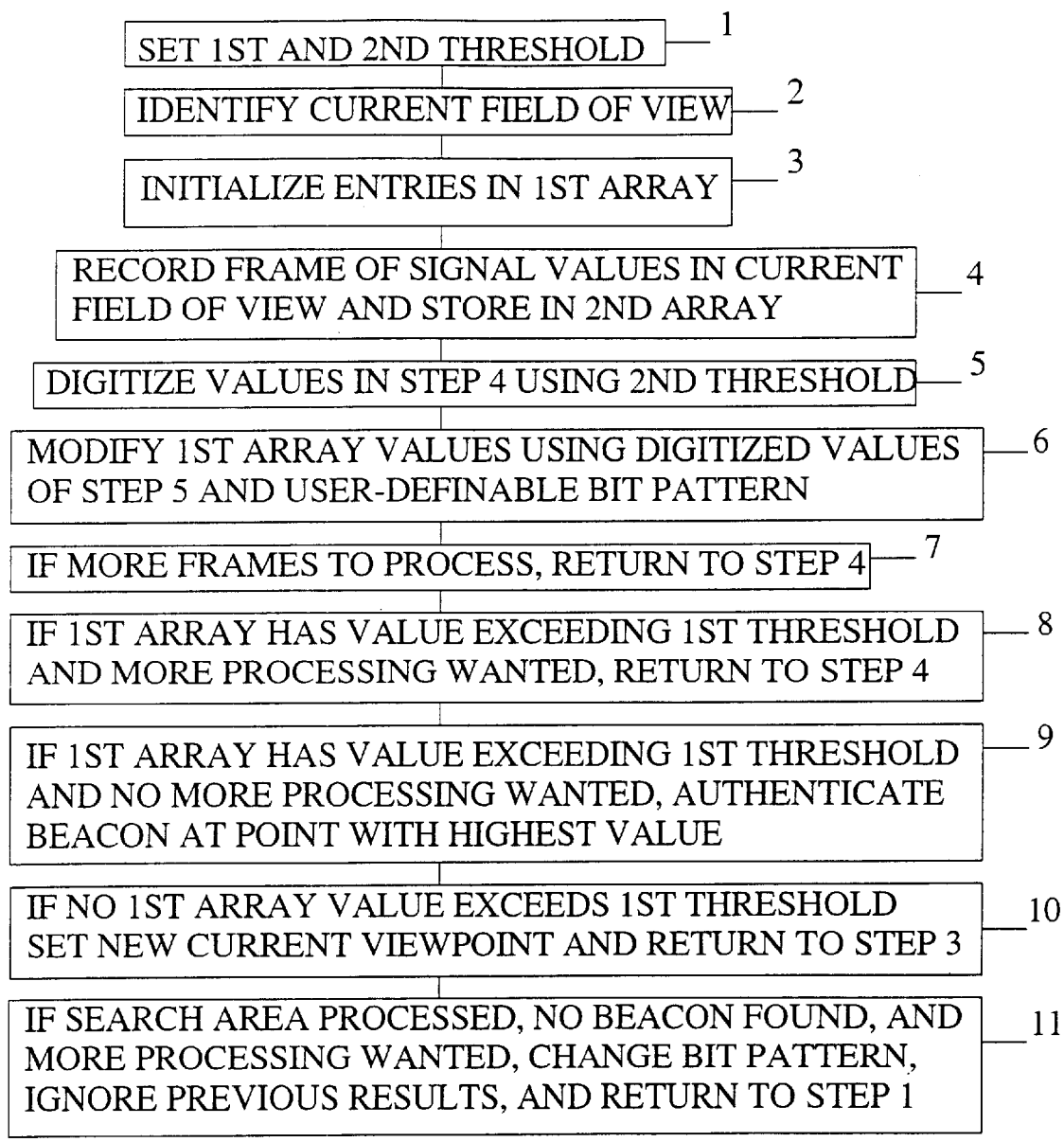
FIG. 1 is a list of the steps of the present invention.

The present invention is a method of verifying that a beacon located is the expected beacon. This is referred to as authenticating a beacon. The beacon may be of any suitable signal type (e.g., optical, infrared, etc.). The present invention is useful in any type of free-space communication device. Presently, laser beacons used for alignment of free-space communication devices are trusted without question. This trust is probably based on the assumption that the chance of two laser beacons being present in the same area and similarly aimed is low. However, with increased use of free-space communication, this assumption may not be valid. FIG. 1 is a list of the steps of the method.

The first step 1 of the method is establishing a first threshold and a second threshold. The first threshold is used for determining whether or not a beacon is present in a field of view. The second threshold is used for digitizing signal intensity values recorded for a field of view.

The second step 2 of the method is identifying a current field of view within a search area in which a search for a particular beacon will be conducted.

The third step 3 of the method is initializing each entry in a first array to a user-definable value. The entries in the first array may be initialized to the same value or to different values to compensate for edge effects, reflections, or any other condition for which different values would be useful. The first array is sized so its elements have a one-to-one correspondence with positional elements in the current field of view. The granularity of the array is dependent on the embodiment of the invention. The first array is used to accumulate received beacon intensity values over time for the current field of view.

The fourth step 4 of the method is recording an intensity value, accumulated over a short time, or "frame" interval, for each element of the current field of view and storing the same in corresponding entries in a second array. The second array is identical to the first array and reinitialized for each subsequent frame in the process. In the preferred embodiment, the intensity of each point in the current field of view is recorded by sampling each point at a frequency greater than the frequency (or bit rate) of a user-definable modulation bit pattern that is used to modulate the beacon of interest. This sampling frequency insures that subsequent scans of the search area for each timing increment will result in identification of the desired beacon. In the preferred embodiment, the modulation bit pattern, which is known by both the transmitter and the receiver, is selected from the group of modulation bit patterns that include a fixed pattern, a pseudo-random pattern, and a cryptographically generated pattern.

The fifth step 5 of the method is to digitize the light-intensity values recorded in the fourth step 4. Digitization is accomplished by comparing each light-intensity value recorded in the second array to the second user-definable threshold and converting the values in the second array that exceed the second user-definable threshold to one of two user-definable values (e.g., 0 or 1). In the preferred embodiment, a light-intensity value is set to one if it exceeds the second threshold and set to zero if it does not.

The sixth step 6 of the method is modifying the values in the first array according to the digitized light-intensity values of the fifth step 5 and the user-definable modulation bit pattern. In the preferred embodiment, a user-definable bit (e.g., the first bit) of the modulation pattern is selected and used to determine whether or not the digitized values in the second array are added or subtracted from the values in the first array. For example, if the user-definable bit is a 1 then addition is the mathematical operation. If it is a zero, then subtraction is the operation. Addition and subtraction in this description are meant to be interpreted as contributing or not contributing to achievement of the first threshold value such that beacons modulated with desired pattern can eventually exceed the first threshold. Only positive correlation of the received light intensity values and the modulation pattern is used to modify the first array in such a way that eventually exceeds the first threshold. Negative correlation may have no effect on the first array or be used to achieve the opposite effect. On subsequent operations of the sixth step 6, subsequent bits in the modulation bit pattern will be used. In the preferred embodiment, the bits will be used in order of occurrence in the pattern. However, in an alternate embodiment, the pattern bits may be selected in ways other that next in line (e.g., every other bit) and in ways other than sequential in time (e.g., reverse order), provided correlation of the received beacon intensity to pattern bits satisfies operational objectives.

In the preferred embodiment, a user-definable small number of samples (e.g., 64), or frames, of data are acquired for the current field of view to quickly determine whether or not a beacon is present with some probability. If the desired number of frames has not been acquired at the current viewpoint then the seventh step 7 is returning to the fourth step 4 to acquire another frame and continue from the fourth step 4 to process the new frame. However, if the desired number of frames has been acquired and processed then proceed to the next conditional step where the condition is satisfied.

If the first array contains a value that exceeds the first threshold then a user-definable large number of frames (e.g., 4096) for the current field of view are acquired and processed to determine if the beacon present is one of interest (e.g., a laser beacon modulated by the user-definable bit pattern) with a higher degree of probability. The first threshold may be changed for each pass through the steps of the present invention. So, if the first array contains a value that exceeds the first threshold and additional processing is desired (i.e., not all of the user-definable large number of frames has been acquired yet) then the eighth step 8 is returning to the fourth step 4 to acquire another frame at the current viewpoint for the current field of view and continuing from there to process the new frame.

If the first array contains a value that exceeds the first threshold and all of the user-definable large number of frames have been acquired and processed then the ninth step 9 of the method is declaring authenticated the beacon at the point in the current field of view that corresponds to the value in the first array that exceeds the first threshold by the widest margin and stopping.

If none of the values in the first array exceeds the first threshold then the tenth step 10 of the method is setting the field of view to another area in the search area which has not been processed and returning to the third step 3 for additional processing. In the preferred embodiment, a spiral pattern is used for selecting another field of view.

If each field of view in the search area is processed and no beacon is found and further processing is desired then the search area is reprocessed, ignoring previous results, but with an adjustment to the user-definable modulation bit pattern. The pattern is advanced, delayed, or circulated (if fixed in length and repeated), a user-definable number of bits. This timing adjustment is necessary if a modulated beacon is present in the field of view but the received beacon's modulated intensity is out of synchronization with the bits of the modulation pattern used to determine the mathematical operation applied in the sixth step 6. By adjusting the modulation pattern, it is hoped that the bit selected to perform the mathematical operation aligns with the same bit that modulates the received beacon at that time. Being in synchronization maximizes the probability of finding a modulated beacon that is present in the field of view. If out of synchronization, a beacon that is present may not be detected due to low pattern correlation. If each field of view in the search area is processed and no beacon is found and continued searching is desired then the eleventh, and last, step 11 of the method is adjusting the user-definable bit pattern x bits (x is a fraction for patterns that can change for each bit) and using the adjusted pattern as the user-definable pattern for processing purposes, ignoring the results of previous steps, and returning to the first step 1 for further processing. After adjusting the pattern over a desired range to account for pattern timing uncertainty, processing may restart with the original pattern.

When a desired beacon is located, steps four 4 through six 6 may be repeated if desired to continuously reconfirm the beacon identity for tracking purposes.

During the beacon location process and during tracking, the first array may be periodically modified as needed to prevent saturation. To prevent values from accumulating in the first array and eventually exceeding the first threshold when there is no modulated beacon present, a decay value is periodically subtracted from the first array. This eventually eliminates array values not associated with desired beacons and determines the degree of data persistence for desired beacons in the array. A properly selected decay value affects, but does not eliminate, data from a correctly modulated beacon. If the desired beacon is lost, incorrectly modulated, or discontinued, after the persistence time of values in the first array, the beacon search process can be reinitiated at the first step 1.

Multiple references arrays (advanced and delayed) or time dithering of pattern usage may be implemented (with appropriate array value testing) in an embodiment as a method to track timing variations due to beacon range variation or different transmitter/receiver clock rates that would otherwise destroy synchronization during a beacon search/tracking duration.

Time multiplexed use of a single source to perform both data communication and beacon functions (particularly during tracking) may be implemented in a given embodiment.

What is claimed is:

1. A method of authenticating a beacon modulated by a user-definable bit pattern, comprising the steps of:
    (a) establishing a first user-definable threshold and a second user-definable threshold;
    (b) identifying a field of view in a search area as a current field of view, where the current field of view includes a number of elements;
    (c) initializing each entry in a first array to a user-definable value;
    (d) recording a signal intensity value for each element in the current field of view and storing the same in corresponding entries in a second array, where the second array is the same size as the first array;
    (e) if a signal intensity value recorded in step (d) exceeds the second threshold then setting the corresponding value in the second array to a first value, otherwise setting the corresponding value in the second array to a second value;
    (f) for a present bit in the user-definable bit pattern, mathematically altering the values of the first array in accordance with the values of the second array;
    (g) if additional processing of the current field of view in the search area is desired, returning to step (d) for additional processing, otherwise proceeding to the next step;
    (h) if at least one of the values in the first array exceeds the first threshold and additional processing is desired then returning to step (d) for additional processing;
    (i) if at least one of the values in the first array exceeds the first threshold and no additional processing is desired then authenticating the beacon in the current field of view at which the first threshold is exceeded by a value in the first array by the greatest amount and stopping;
    (j) if none of the values in the first array exceeds the first threshold then setting the current viewpoint to an unprocessed point in the search area and returning to step (c) for additional processing; and
    (k) if each field of view in the search area is processed and no beacon is found and further processing is desired then adjusting the user-definable bit pattern x bits and using the adjusted pattern as the user-definable bit pattern for processing purposes, ignoring the results of previous steps, and returning to step (a) for further processing.

2. The method of claim 1, wherein the modulated beacon to be authenticated is modulated using a pattern of any length selected from the group of patterns consisting of a fixed pattern, a pseudo-random pattern, and a cryptographically generated pattern.

3. The method of claim 1, wherein said step of mathematically altering, for a bit in the user-definable bit pattern, the values of the first array in accordance with the values of the second array is comprised of the steps of:
   (a) identifying the present bit in the user-definable bit pattern that will be used to mathematically alter the values in the first array;
   (b) subtracting corresponding values in the second array from the first array if the present bit is of the second value;
   (c) adding corresponding values from the second array to the first array if the present bit is of the first value; and
   (d) setting the present bit to a different bit in the user-definable bit pattern.

4. The method of claim 1, further including the step of moving to a new field of view if no beacon is found after the previous fields of view were processed.

5. The method of claim 1, further including the step of subtracting a decay value from each entry in the first array.

6. The method of claim 1, wherein said step of recording a signal intensity value for each area in the current field of view and storing the same in corresponding entries in a second array is comprised of the step of recording a signal intensity value for each element in the current field of view at a rate greater than the rate of the user-definable modulation bit pattern.

7. The method of claim 1, wherein said step of setting the current viewpoint to an unprocessed point in the search area is comprised of the step of setting the current viewpoint to an unprocessed point in the search area using a spiral pattern.

8. The method of claim 2, wherein said step of mathematically altering, for a bit in the user-definable bit pattern, the values of the first array in accordance with the values of the second array is comprised of the steps of:
   (a) identifying the present bit in the user-definable bit pattern that will be used to mathematically alter the values in the first array;
   (b) subtracting corresponding values in the second array from the first array if the present bit is of the second value;
   (c) adding corresponding values from the second array to the first array if the present bit is of the first value; and
   (d) setting the present bit to a different bit in the user-definable bit pattern.

9. The method of claim 8, further including the step of moving to a new field of view if no beacon is found after the previous fields of view were processed.

10. The method of claim 9, further including the step of subtracting a decay value from each entry in the first array.

11. The method of claim 10, wherein said step of recording a signal intensity value for each area in the current field of view and storing the same in corresponding entries in a second array is comprised of the step of recording a signal intensity value for each element in the current field of view at a rate greater than the rate of the user definable modulation bit pattern.

12. The method of claim 11, wherein said step of setting the current viewpoint to an unprocessed point in the search area is comprised of the step of setting the current viewpoint to an unprocessed point in the search area using a spiral pattern.

* * * * *